Oct. 15, 1940.  A. A. AINSWORTH  2,218,305
FILING SYSTEM FOR PHOTOGRAPHIC PRINTS AND FILMS
Filed Nov. 19, 1937  2 Sheets-Sheet 1
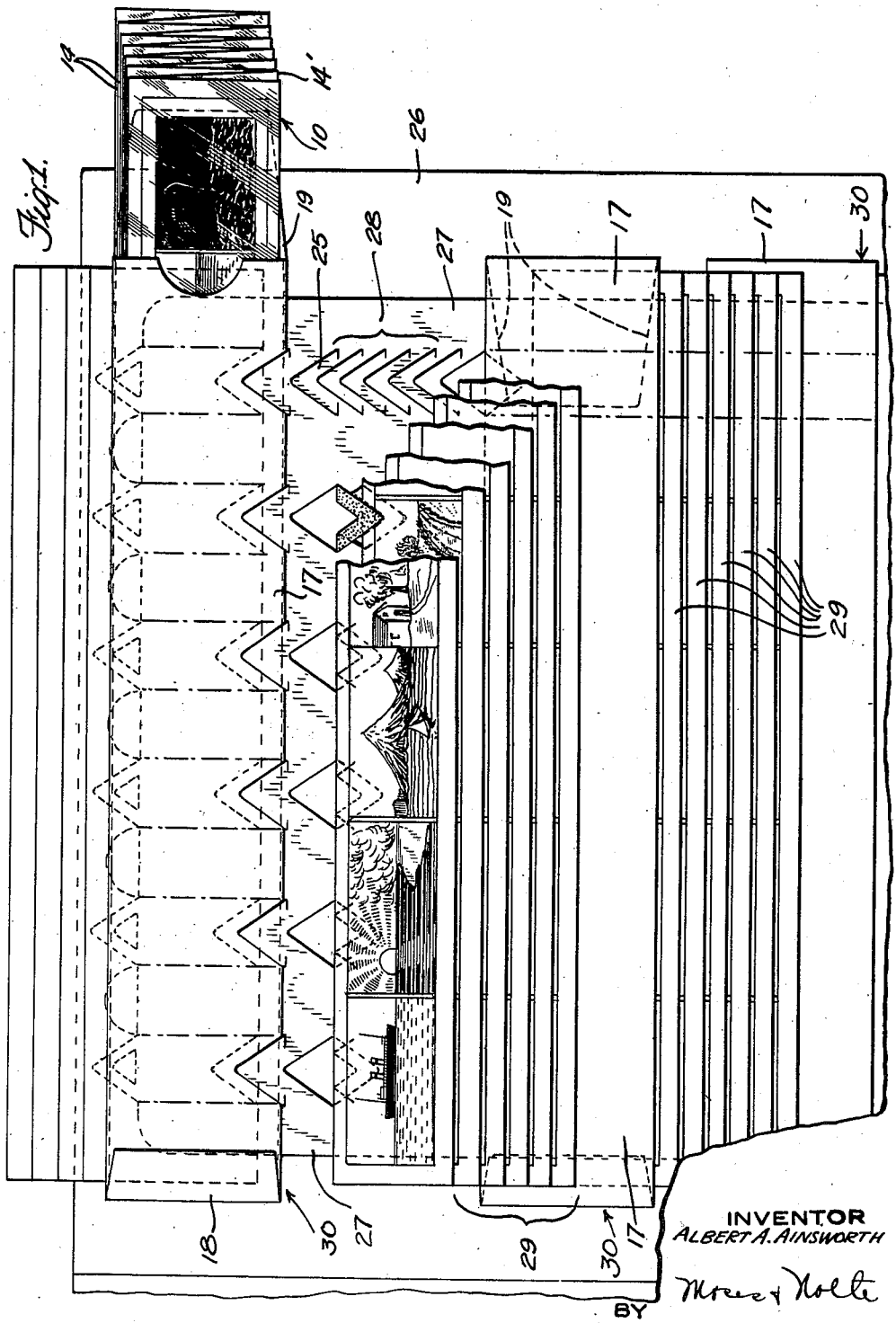
INVENTOR
ALBERT A. AINSWORTH
BY
ATTORNEYS Oct. 15, 1940.   A. A. AINSWORTH   2,218,305
FILING SYSTEM FOR PHOTOGRAPHIC PRINTS AND FILMS
Filed Nov. 19, 1937   2 Sheets-Sheet 2
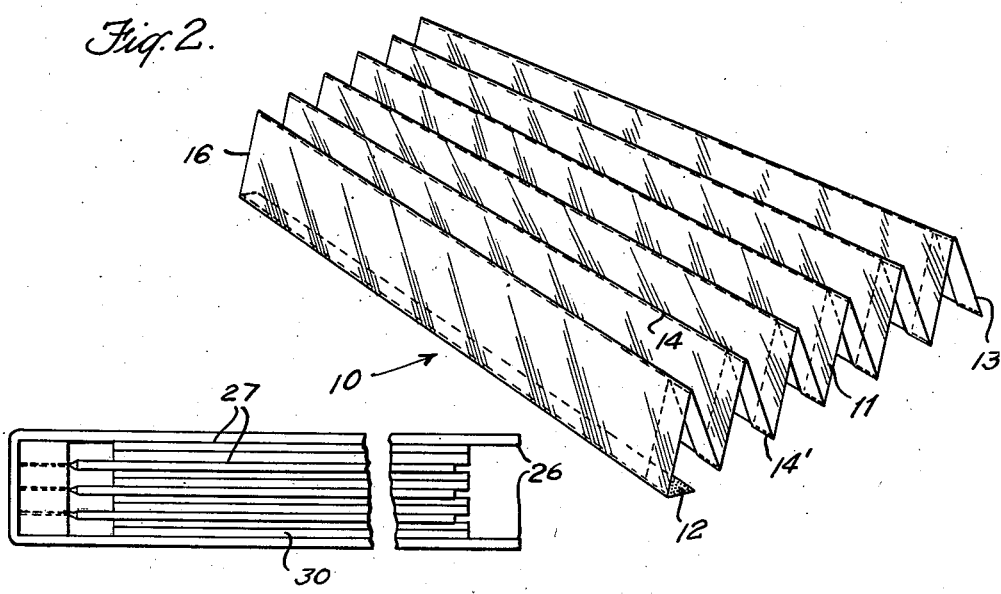
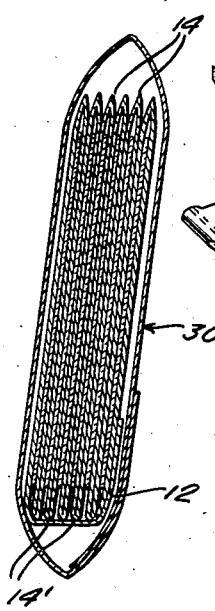
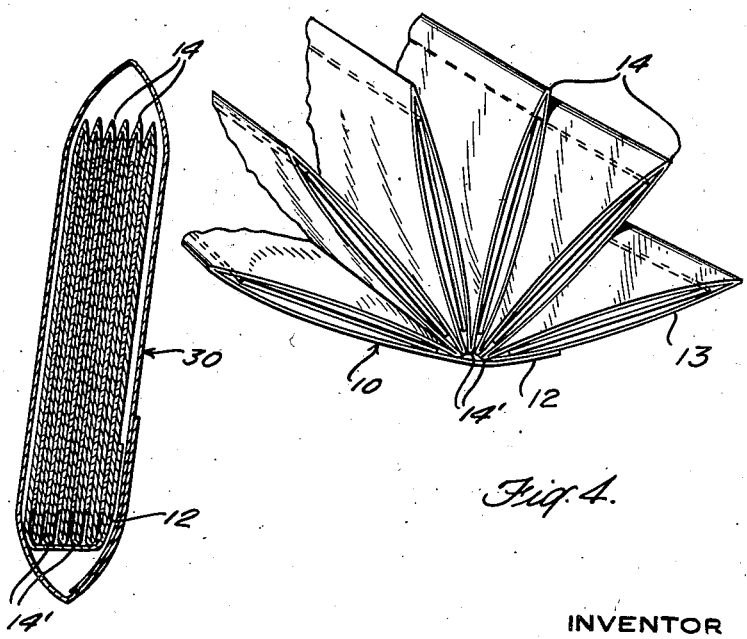
INVENTOR
ALBERT A. AINSWORTH.
BY
ATTORNEYS Patented Oct. 15, 1940

2,218,305

UNITED STATES PATENT OFFICE 2,218,305

FILING SYSTEM FOR PHOTOGRAPHIC PRINTS AND FILMS

Albert A. Ainsworth, Ossining, N. Y.

Application November 19, 1937, Serial No. 175,372

1 Claim. (Cl. 129—20)

This invention relates to filing and storage systems and to film containers for use therein for filing or storage of photographic films or prints.

Users of miniature cameras are constantly beset with the problem of suitable storage and classification systems for both negatives and pictures. This arises principally from the fact that miniature cameras have extremely small negatives for each individual picture and accordingly, the corresponding print developed therefrom is so small that an adequate representation of the object photographed is not thereby obtained. For this reason, the practice in the miniature camera field is to have the picture obtained printed in the size of the negative for filing or reference purposes only and to print in enlarged form such exposures as are found to be valuable or useful.

Miniature camera film is customarily prepared in rolls containing a substantial number of exposures such as forty-eight or the like and in development these rolls are cut up into strips of equal length, making a strip of four, or six negatives. In printing these negatives it is the custom to print an entire strip of pictures from the strip of negatives regardless of the relation of the pictures to each other and then to mount the pictures and negatives as far as possible in suitable storage space for reference as to possible future enlargement.

Various types of storage and filing devices are known which provide for the storage of the pictures or the films but the majority of these possess the disadvantage that excessive handling of the negative is necessary in order to inspect it. A further disadvantage exists in the filing devices heretofore used in that they fail to keep the films in proper condition since they are not dust-proof and do not adequately guard the negatives from damage or deterioration.

Adequate and effective storage means for photographic negatives are required to possess special characteristics not found in ordinary filing systems. The storage compartment for the individual negative must be comparatively scratchless so that insertion or removal of the negative from the storage compartment will not result in damage to it. In addition, it is necessary that it be possible to inspect the negative without removing it from the storage compartment, thus avoiding the possibility of placing finger prints on the negative or scratching it.

It is an object of this invention to provide filing and storage systems for the classification and preservation of photographic negatives and their corresponding photographs.

It is an object of this invention to provide a storage envelope which will hold a plurality of strips of developed film in substantially dustless and dry condition.

It is a further object of this invention to provide such a storage envelope which may readily be used in relation to the small developed pictures themselves such that the pictures and negatives may be stored in close proximity and in predetermined relation to each other.

Another object of the invention is to provide mounting and retaining means for the developed pictures and the envelope containing a plurality of negatives.

Another object is to provide a sectioned storage envelope of inexpensive and durable construction which will store a large number of negatives in individual compartments and which will permit the user thereof to inspect a single negative without removing the same from its compartment, or disturbing the other negatives contained in the envelope.

Another object is to provide a suitable supplemental covering envelope to enclose and guard the sectioned envelope and which is adapted to be mounted in close proximity and predetermined relation to the developed prints.

Further objects and advantages will appear from the detailed description and drawings in which Fig. 1 is a plan view of a mounting device showing a series of strips of developed photographs mounted thereon partially broken away to show the mounting means and showing the envelope of this invention in relation to the mounting means and the strips of photographs and its supplemental covering envelope;

Fig. 2 is a view in perspective of the envelope of this invention before pasting, indicating the method of construction;

Fig. 3 is a view in cross section through the envelope and its supplemental covering envelope having films contained therein as shown in Fig. 1;

Fig. 4 is an end view in perspective of the inner end of the envelope of this invention with negatives contained therein; and Fig. 5 is an end view of an album in which the envelope of this invention is adapted to be used.

In pursuance of the objects of this invention a portion of paper 10 which is preferably transparent is provided. This paper is preferably folded in folds in alternating directions, which may be called accordion folds 14, 14', the width between each fold being equal and being slightly greater than the width of the strip photographic film intended to be stored therein as shown in Fig. 2. On the last fold on one end of this accordion-like construction, provision is made for a small flap 12 which, when the various folds are brought together, is adapted to engage the first fold 13 on the opposite end of the paper and be permanently secured thereto by mucilage or other means. When so folded the envelope presents an appearance such as is shown in Fig. 4 of a series of similar folds of paper, making a series of superimposed storage compartments, held together on one side by the connection between the flap 12 and the portion 13, said compartment being free to rotate through an arc having its axis at the fold point of the flap 12. The advantage of this construction can readily be seen when it is considered that by grasping the portion of the envelope where the compartments are held together and manipulating the opposite side where the compartments are free to move, an individual compartment may be located with the finger and the negative inspected through the transparent cover without the necessity of removing the negative or of disturbing the other negatives in different compartments in the same envelope.

To facilitate further the easy inspection of the negative with a minimum of manipulation, the ends of each successive compartment of the envelope are progressively longer as shown in the envelope in Fig. 1 so that the end of the completely folded envelope presents an appearance of stepped relationship. This may be very simply provided for by cutting the paper, before folding, on a slight bias. Accordingly, when it is desired to locate one particular compartment, it is a simple operation to place a finger on that step which corresponds to the compartment.

Since, however, this outer end of the storage envelope receives the most wear of the entire unit, due to handling and other causes, I preferably fold the outer end of the paper used to form the envelope before the accordion folds are made so that the marginal fold shown at 11 in Fig. 2 presents to the finger of the user of the envelope a relatively smooth and strong end rather than the brittle sharp end of unfolded paper. I prefer not to secure this fold to the rest of the envelope since it is unnecessary and also since it is desirable to avoid excess mucilage.

It will be noted that the envelope so described is not intended to be closed at either end, having at one end the raw edge of the paper 16 and at the other the folds 11. Accordingly, the above described envelope and its complement of photographic negatives contained therein, is preferably inserted into a flapped envelope of suitable shape, such as is shown in Fig. 1 at 17, having a pasted closure flap 18 at one end and a larger flap 19 which is preferably ungummed at the other. When the transparent envelope is placed in this supplemental envelope 17 and the flap 19 folded over, the negatives are held in a safe, dustless and relatively moisture-proof container from which the transparent container may be readily extracted for inspection without the necessity of handling or otherwise injuring the film proper.

In the construction of my inner storage envelope I prefer to use "glassine" for the reason that it is suitably transparent to permit inspection of the films without removal therefrom and for the further reason that it is "sweat" proof. Other conventional transparent mediums may be used such as "Cellophane" or ordinary wax paper, but these have the disadvantage of condensing atmospheric moisture or "sweating" and thereby causing possible injury to the film. The covering or supplemental envelope is preferably made of a more substantial stock of paper and need not be transparent. The flap 19 is preferably of considerable size in relation to the width and length of the envelope as shown in Fig. 1 in order to insure further the dust-proof property of the envelope.

It can easily be seen that this type of storage envelope may be attached to any suitable back in any suitable manner. I have found it preferable to use a relatively stiff supporting back 26 having mounted thereon a gummed sheet 27 from which a number of hinges have been cut of the type shown at 25 in Fig. 1. Preferably I provide these hinges in vertical parallel columns 28 down the supporting sheet so that strips of photographs 29 or envelopes 30 containing negatives, may be mounted in stepped relationship on the page with each strip of photographs or envelopes overlying and partially concealing the one below it. By using this method of mounting I have been able to utilize a very small space of supporting back to hold a large number of photographs and envelopes containing negatives. I have found these mounting means useful for all sorts of photographic mounts and other mounts but I have found it desirable, particularly in the mounting of miniature camera films and photographs, in combination with my transparent storage envelope, to mount a series of strips of photographs having, for example, six photographs to the strip in relation to the negative which is contained in the envelope mounted thereunder. Accordingly, where a series of six strips of photographs is mounted in stepped relationship, one beneath the other, I preferably mount the supplemental envelope containing the storage envelope in the place beneath the sixth strip of photographs and store in my storage envelope contained in this supplemental envelope the six strips of negatives corresponding to the photographs mounted there above.

I further found it convenient to retain the same order in the insertion of the negatives in the transparent envelope as is maintained in the stepped relation of the strips of photographs mounted above the envelope so that if the desired picture appears at the first position of the second strip in a series, for example, I need only turn over the storage envelope, withdraw therefrom the transparent container, and locate the second position on the stepped fold of the said container and withdraw therefrom or examine the negative to which the photograph belongs.

My new storage device is not limited particularly to miniature camera uses but is adapted for use in all sorts of photographic work, both amateur and professional, and further for use in any field where it is desired to mount a valuable but fragile record in position to be examined with maximum ease and minimum handling of the record or paper.

While I have illustrated and described in detail certain preferred forms of my invention, it is to be understood that changes may be made therein and the invention embodied in other structures. I do not, therefore, desire to limit myself to the specific constructions illustrated, but intend to cover my invention broadly in whatever form its principle may be utilized.

I claim:

A storage envelope for photographic negatives comprising a single sheet of material folded to form a series of superimposed compartments, each compartment being adapted for storage of a single negative or strip thereof, one end of the said series of compartments being arranged so that the individual compartments are in stepped relation to each other to facilitate easy location of an individual compartment.

ALBERT A. AINSWORTH.